(12) United States Patent
Bhattacharjee et al.

(10) Patent No.: US 11,295,239 B2
(45) Date of Patent: Apr. 5, 2022

(54) PEER ASSISTED DISTRIBUTED ARCHITECTURE FOR TRAINING MACHINE LEARNING MODELS

(71) Applicant: International Business Machines Corporation, Armonk, NY (US)

(72) Inventors: Bishwaranjan Bhattacharjee, Yorktown Heights, NY (US); Paul C. Castro, Sharon, MA (US); Vatche Isahagian, Belmont, MA (US); Vinod Muthusamy, Austin, TX (US); Aleksander Slominski, Riverdale, NY (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 16/386,561

(22) Filed: Apr. 17, 2019

(65) Prior Publication Data
US 2020/0334567 A1 Oct. 22, 2020

(51) Int. Cl.
| | |
|---|---|
| *G06N 20/00* | (2019.01) |
| *H04L 29/08* | (2006.01) |
| *G06F 9/48* | (2006.01) |
| *H04L 67/10* | (2022.01) |

(52) U.S. Cl.
CPC ........... *G06N 20/00* (2019.01); *G06F 9/4887* (2013.01); *H04L 67/10* (2013.01)

(58) Field of Classification Search
CPC combination set(s) only.
See application file for complete search history.

(56) References Cited

U.S. PATENT DOCUMENTS

| | | | |
|---|---|---|---|
| 9,769,536 B2 | 9/2017 | Bergstrom | |
| 10,841,236 B1* | 11/2020 | Jin | G06F 9/5072 |
| 2003/0004748 A1* | 1/2003 | Coleman | G06N 5/02 705/7.34 |
| 2015/0324690 A1 | 11/2015 | Chilimbi et al. | |

(Continued)

OTHER PUBLICATIONS

Disclosed Anonymously, "Automatically Scaling Multi-Tenant Machine Learning," IP.com No. IPCOM000252098D, IP.com Electronic Publication Date: Dec. 15, 2017.

(Continued)

*Primary Examiner* — El Hadji M Sall
(74) *Attorney, Agent, or Firm* — Patterson + Sheridan, LLP (57) ABSTRACT

Techniques for distributing the training of machine learning models across a plurality of computing devices are presented. An example method includes receiving, from a computing device in a distributed computing environment, a request for a set of outstanding jobs for training part of a machine learning model. A system transmits, to the computing device, information identifying the set of outstanding jobs. The system receives, from the computing device, a selected job for execution on the computing device from the set of outstanding jobs. A chunk of training data associated with the selected job and one or more parameters associated with the selected job may be transmitted to the computing device, and the system may take one or more actions with respect to the chunk of data associated with the selected job based on a response from the computing device.

20 Claims, 4 Drawing Sheets

(56) References Cited

U.S. PATENT DOCUMENTS

2015/0379430 A1* 12/2015 Dirac .................... G06N 20/00
                                                        706/12
2017/0263150 A1*  9/2017 Gordon .............. G06Q 10/1053
2019/0130327 A1*  5/2019 Carpenter ........... G06F 9/45558

OTHER PUBLICATIONS

Disclosed Anonymously, "Identifying Sources of a Change in Metrics of a Stack of Servers," IP.com No. IPCOM000252099D, IP.com Electronic Publication Date: Dec. 15, 2017.
Bao et al, "Online Job Scheduling in Distributed Machine Learning Clusters," arXiv:1801.00936v1 [cs.DC] Jan. 3, 2018.
Dai et al.,"BigDL: A Distributed Deep Learning Framework for Big Data,", 14 pages.

\* cited by examiner

PEER ASSISTED DISTRIBUTED ARCHITECTURE FOR TRAINING MACHINE LEARNING MODELS

BACKGROUND

The present invention relates to training machine learning models, and more specifically, to distributing the training of machine learning models across a plurality of endpoint computing devices in a network.

Machine learning generally uses trained models to perform a task based on inferences or predictions made from a given input value. These models may be trained using supervised learning techniques, where a training data set includes a plurality of labeled data points; semi-supervised learning techniques, where the training data set includes a subset of labeled data points and a subset of unlabeled data points which are used to refine the predictions generated by the trained machine learning model; or unsupervised learning techniques, where the training data set includes unlabeled data points, and the machine learning model is trained to identify similarities or differences between data points in the training data set. Typically, machine learning models may be developed to perform a variety of tasks, such as data classification or categorization, subject recognition in images, generating content recommendations to a user of an application or website, autonomous control of motor vehicles, text recognition, and the like.

Training machine learning models may be a computationally expensive process that may involve the use of large training sets of data to develop weightings and other values used in the trained machine learning models to perform a given task. For example, a training data set may include gigabytes or terabytes of data. Training a machine learning model using such a data set may, thus, involve the use of a large number of general purpose computing systems in a server farm and/or specialized processors for performing machine learning (or deep learning) tasks. These specialized processors may include, for example, massively parallel coprocessing systems, graphical processing units (GPUs), tensor processors, or other types of processors that may be used to quickly process large data sets. Even through the use of clusters of computing systems or specialized processors, training machine learning models may be a time-consuming process. Because training machine learning models may be a computationally expensive and time-consuming process on clusters of dedicated systems, training machine learning models on a single computing device (e.g., a workstation) or a small number of computing devices may be impractical.

SUMMARY

One embodiment of the present disclosure provides a method for distributing training of a machine learning model across a plurality of computing devices in a distributed computing environment. The method generally includes receiving, from a computing device of the plurality of computing devices in the distributed computing environment, a request for a set of outstanding jobs for training part of a machine learning model. A system transmits, to the computing device, information identifying the set of outstanding jobs. The system receives, from the computing device, a selected job for execution on the computing device from the set of outstanding jobs. The selected job may be associated with a machine learning model to be trained. A chunk of training data associated with the selected job and one or more parameters associated with the selected job may be transmitted to the computing device, and the system may take one or more actions with respect to the chunk of data associated with the selected job based on a response from the computing device.

Another embodiment of the present disclosure provides a system having a processor and memory. The memory generally has instructions stored thereon which, when executed by the processor, performs an operation for distributing training of a machine learning model across a plurality of computing devices in a distributed computing environment. The operation generally includes receiving, from a computing device of the plurality of computing devices in the distributed computing environment, a request for a set of outstanding jobs for training part of a machine learning model. A system transmits, to the computing device, information identifying the set of outstanding jobs. The system receives, from the computing device, a selected job for execution on the computing device from the set of outstanding jobs. The selected job may be associated with a machine learning model to be trained. A chunk of training data associated with the selected job and one or more parameters associated with the selected job may be transmitted to the computing device, and the system may take one or more actions with respect to the chunk of data associated with the selected job based on a response from the computing device.

Still another embodiment of the present disclosure provides a computer-readable medium having instructions stored thereon which, when executed by one or more processors, performs an operation for distributing training of a machine learning model across a plurality of computing devices in a distributed computing environment. The operation generally includes receiving, from a computing device of the plurality of computing devices in the distributed computing environment, a request for a set of outstanding jobs for training part of a machine learning model. A system transmits, to the computing device, information identifying the set of outstanding jobs. The system receives, from the computing device, a selected job for execution on the computing device from the set of outstanding jobs. The selected job may be associated with a machine learning model to be trained. A chunk of training data associated with the selected job and one or more parameters associated with the selected job may be transmitted to the computing device, and the system may take one or more actions with respect to the chunk of data associated with the selected job based on a response from the computing device.

DETAILED DESCRIPTION

Embodiments presented herein describe techniques for distributing the training of machine learning models across a plurality of computing systems. These computing systems may include, for example, desktop computers, laptop computers, workstations, tablets, mobile phones, or other computing devices that can obtain a portion of a training data set, perform a training process using the obtained portion of the training data set, and report a set of learned information to a server managing the training of a machine learning model. Generally, by distributing the training of machine learning models across a plurality of computing systems, embodiments presented herein may use excess computing resources (e.g., central processing unit (CPU) cores, memory, co-processors, cores on a graphics processing units, etc.) on a plurality of computing systems that would otherwise be unused. Further, by distributing the training of machine learning models across a plurality of computing systems, embodiments presented herein provide allow for the training of such models without a user needing to establish or obtain a cluster of general purpose computers or specialized processors dedicated to training a machine learning model.

As discussed herein, a system for distributing the training of machine learning models may include a plurality of client devices on which a training application or library executes and a job dispatcher that distributes portions of a machine learning job to the plurality of client devices. Users of a client device can download the training application or library to register with a model training manager, request a list of machine learning jobs that are pending and obtain a portion of a training data set to use in training a portion of a machine learning model. The portion of the trained machine learning model generated based on the obtained portion of the training data set may be reported back to the model training manager, and the client device can obtain another portion of a training data set to use in training the same or a different machine learning model.

Figure 1:
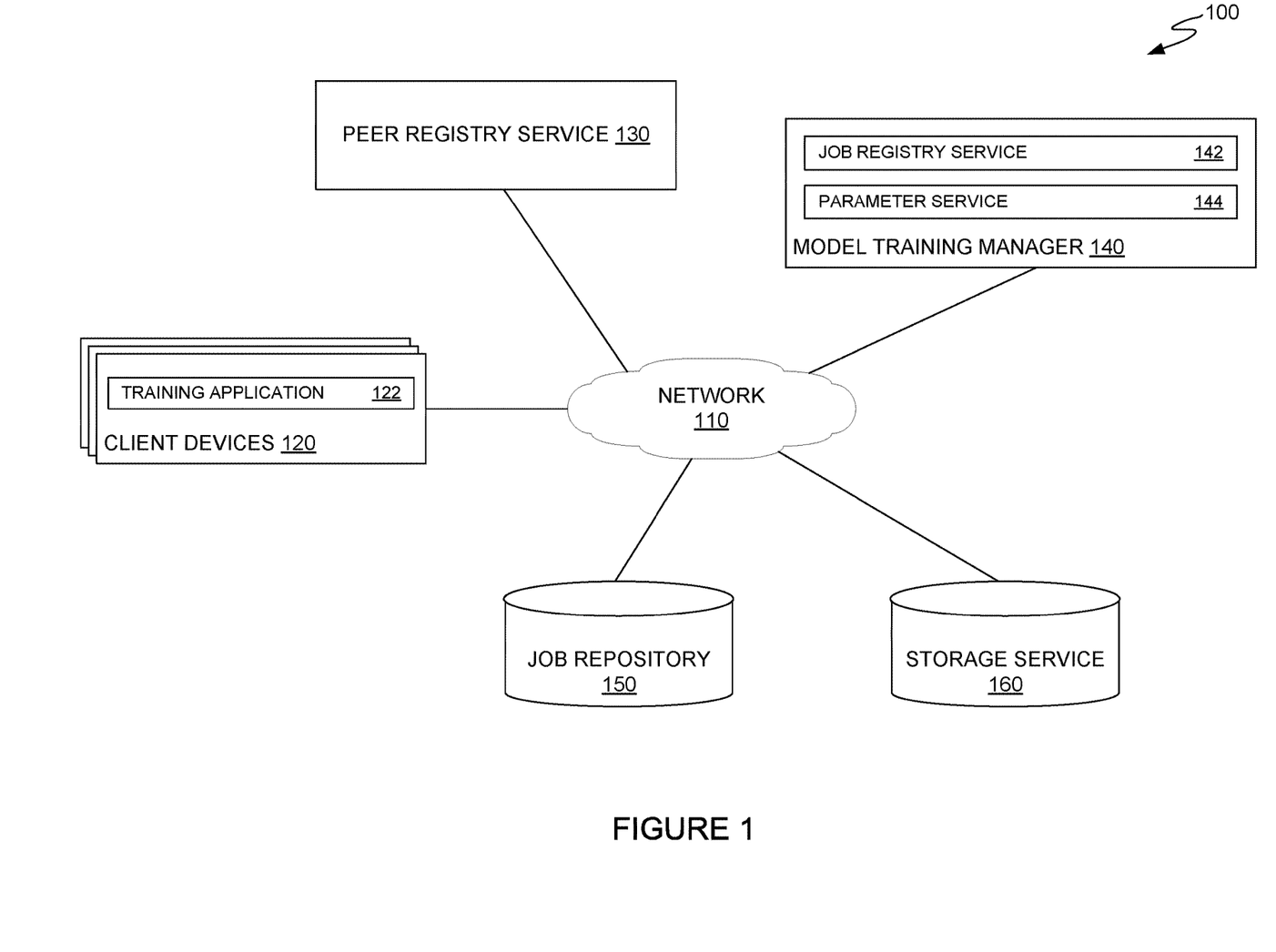
FIG. 1 illustrates an example networked environment in which training of machine learning models are distributed across a plurality of client devices, according to one embodiment.

FIG. 1 illustrates an example networked computing environment in which training of machine learning models is distributed across a plurality of client devices, according to an embodiment of the present disclosure. As illustrated, computing environment 100 includes a plurality of client devices 120, a peer registry service 130, a model training manager 140, a job repository 150, and a storage service 160, connected via network 110.

Client devices 120 are generally representative of computing devices on which a user can download applications or application libraries that interact with model training manager 140 to perform training processes for a machine learning model using a portion of a training data set provided by model training manager 140. Client device 120 may be, for example, a laptop computer, a desktop computer, a thin client, a tablet computer, a workstation, a mobile computing device, a gaming console, and the like. As illustrated, client device 120 includes a training application 122. Client device 120 may download and install training application 122 from peer registry service 130 when a user of the client device 120 registers the client device 120 with peer registry service 130 as a client device that is available for use in training part of a machine learning model. Training application 122 may include, for example, a standalone application (e.g., a downloadable application executing on a computing device) or a library that can be integrated into another application. Generally, training application 122 includes one or more machine learning models that can be used, in conjunction with training data and model parameters obtained from model training manager 140, to train a portion of a machine learning model. In some embodiments, training application 122 may include neural networks, various classifiers, linear regression models, decision trees, clustering algorithms, and other machine learning algorithms that may be used in training a part of a machine learning model.

In some embodiments, training application 122 may further include a benchmarking application that may be executed when training application 122 is installed on client device 120 or if a hardware configuration of client device 120 changes. A change in the hardware configuration of client device 120, such as the replacement or addition of a central processing unit (CPU) or graphics processing unit (GPU) to client device 120, may result in a change in the ability of the client device 120 to process a portion of a training data set changes. Training application 122 may, for example, record hardware configuration information about client device 120 (e.g., each time training application 122 is executed) and compare the recorded configuration information to the current hardware configuration of client device 120. If a discrepancy exists between the current hardware configuration of client device 120 and the previously recorded hardware configuration of client device 120, training application 122 can execute the benchmarking application. The benchmarking application may include, for example, executable code used to determine the amount of time needed for client device 120 to process a data set of a fixed size. The benchmarking application may generate a performance metric for the client device relative to a baseline computing device and report the generated performance metric to peer registry service 130 for use in assigning training data sets to client device 120 for processing, as discussed in further detail herein.

To participate in training a machine learning model, training application 122 executing on a client device 120 can request, from model training manager 140, a list of outstanding jobs that client device 120 can participate in. Each of the outstanding jobs may be associated with a particular machine learning model to be trained and a particular training data set associated with the particular machine learning model. Training application 122 transmits, to model training manager 140, an indication of a selected outstanding job for client device 120 to participate in processing. In some embodiments, the selected outstanding job may be selected by training application 122. Training application 122 may select an outstanding job, for example, randomly, based on a priority level assigned to an outstanding job, based on a number of client devices currently participating in processing an outstanding job, and the like. In some embodiments, the selected outstanding job may be selected by a user of training application 122 through a user interface presented by training application 122.

In response, training application 122 receives an indication of a training data set and model parameters from model training manager 140. The training data set may be a subset of a larger training data set associated with the selected outstanding job and may be sized such that it is feasible to train a portion of a machine learning model on client device 120 within a timeout period and without negatively impacting the performance of other processes executing on client device 120. To train the portion of the machine learning model associated with the selected outstanding job, training application 122 applies the model parameters received from model training manager 140 to components of training application that implement the type of model to be trained, obtains the training data set from storage service 160, and feeds the training data set into the model. Training application 122 may generate a set of results by processing the received training data set through the machine learning model and may transmit the results to model training manager 140. In some embodiments, the set of results may include a set of weights for the machine learning model associated with the selected outstanding job. After transmitting the results to model training manager 140, training application 122 can request further sets of training data to train the machine learning model associated with the selected outstanding job or choose to participate in training a machine learning model associated with a different outstanding job. If, however, training application 122 fails to complete processing of the received training data set within a specified timeout period, training application 122 need not transmit data to model training manager 140 related to the selected outstanding job. As discussed in further detail below, model training manager 140 can adjust a performance metric of client device 120 to reflect degraded or lesser expected performance from client device 120 and assign smaller training data sets to client device 120 for processing.

In some embodiments, training application 122 may determine when to train a portion of a machine learning model based, for example, on connectivity and power properties of a client device 120 on which training application 122 executes. For example, training application 122 may execute training processes on client device 120 if client device 120 has sufficient battery power to execute the job or if client device 120 is connected to a power supply. In another example, training application 122 may download training data sets from storage service 160 and/or report results of training a portion of a machine learning model to model training manager 140 based on a connectivity status of the client device 120. For example, if client device 120 is connected to a local area network (LAN) or wireless LAN, training application 122 can initiate a training process by downloading a training data set from storage service 160. If, however, client device 120 is connected to a cellular network, training application 122 may defer initiating training processes on client device 120 until client device 120 joins a LAN or WLAN. Deferring the initiation of training processes while a client device is connected to a cellular network may be performed, for example, to reduce an impact of participating in training a machine learning model on a user's data usage caps. Further, deferring the initiation of training processes may reduce negative impacts on the battery life of client device 120 based on assumptions that a client device connected to a cellular network may also not be connected to a power supply.

Peer registry service 130 generally allows client devices 120 to register to participate in training machine learning models in a distributed computing environment. In some embodiments, peer registry service 130 may expose a registration portal that allows users of client devices 120 to register to participate in training machine learning models in a distributed computing environment and download training application 122 for installation and execution on client device 120. Generally, peer registry service 130 may receive information about a client device 120 when a client device downloads and executes training application 122 or an application including training libraries that may be used to perform model training tasks assigned by model training manager 140. This information may, for example, link a client device 120 with a specific user and may indicate an amount of available computing resources on client device 120 that can be used to train a portion of a machine learning model. Information linking a client device 120 with a specific user may include a Media Access Control (MAC) address of a network interface controller on client device 120, a unique identifier assigned by peer registry service 130 to client device 120, an International Mobile Equipment Identity (IMEI) number of a client device 120 with a cellular radio, or other information that may uniquely identify a client device 120. As discussed, information indicating an amount of available computing resources on client device 120 may be generated based on a benchmarking application included with training application 122 that tests the performance of client device 120 to determine how much data client device 120 can process in training a portion of a machine learning model within a given amount of time. The information indicating an amount of available computing resources on client device 120 may be updated periodically or aperiodically to reflect, for example, changes in the performance of algorithms for training machine learning models included in training application 122 or changes in hardware performance on client device 120 resulting from the replacement or addition of CPUs, GPUs, memory, and other components.

Model training manager 140 generally orchestrates the assignment of training tasks to client devices 120 in a distributed system to facilitate the training of machine learning models by a plurality of client devices 120. In orchestrating the assignment of training tasks to client devices 120, model training manager 140 generally distributes training of a machine learning model across a plurality of client devices 120. Each of the plurality of client devices 120 may be instructed by model training manager 140 to execute a model training process using a portion of a training data set and return a set of results to model training manager 140. Model training manager 140 may combine the results generated by each of the plurality of client devices 120 to generate a trained machine learning model that can be exported for deployment on another computing system. As illustrated, model training manager 140 includes a job registry service 142 and a parameter service 144.

Job registry service 142 generally receives requests for information about outstanding jobs that a client device can participate in processing and distributes the training of machine learning models to a plurality of client devices 120. In some embodiments, Job registry service 142 may initially receive, from training application 122 executing on client device 120, a request for a list of jobs that are currently outstanding. In response, job registry service 142 may obtain a list of the currently outstanding jobs from job repository 150. Outstanding jobs in job repository 150 may have a status indicating that a job has not been started, is currently being processed, or has failed processing and is to be re-processed. The list of jobs may include an identifier of each outstanding job, a type of machine learning model being trained, and an amount of data remaining to be analyzed to complete a training process associated with each outstanding job.

In some embodiments, some outstanding jobs included in job repository 150 may have access limitations that restrict the training process to certain devices or groups of devices for security or confidentiality reasons. The list of jobs returned from job repository 150 may, in some embodiments, further include access limitation information associated with each of the outstanding jobs. The access limitation information may, for example, indicate domains or networks that client devices 120 are to be members of in order to participate in processing a job, credentials needed to authenticate with job registry service 142 and parameter service 144 in order to obtain job information and a chunk of a training data set to use in training a portion of a machine learning model.

After transmitting the list of jobs to a client device 120, job registry service 142 may receive a selection of a job in the list of jobs from client device 120. Job registry service 142 can add client device 120 to a list of client devices that are participating in performing the training task associated with the selected job and indicate to client device 120 that the client device 120 may obtain an identification of chunk of data to be processed from parameter service 144. In some embodiments, where a selected job is associated with access limitations, job registry service 142 can verify that the user of client device 120 is allowed to participate in training the machine learning model associated with the selected job. If the user of client device 120 is allowed to participate in training the machine learning model associated with the selected job, job registry service 142 can add the client device 120 to the list of client devices that are participating in performing the training task associated with the selected job. To determine whether a user is allowed to participate in training the machine learning model associated with the selected job, job registry service 142 may verify user login credentials or determine that client device 120 is a member of a specified network or domain. Upon determining that the user of client device 120 is allowed to participate in training the machine learning model, job registry service may indicate to client device 120 that the client device 120 is allowed to obtain an identification of chunk of data to be processed from parameter service 144. If, however, job registry service 142 determines that the user of client device 120 is not allowed to participate in training the machine learning model associated with the selected job, job registry service 142 can return an error message to client device 120. The error message may indicate that client device 120 is not allowed to participate in training the machine learning model associated with the selected job and request that training application 122 or a user of client device 120 select a different job to participate in processing.

In some embodiments, job registry service 142 may include information usable by training application 122 to configure an algorithm for training a portion of a machine learning model associated with the selected job. The configuration information may include model hyperparameters that control how the portion of the machine learning model is trained, such as a number of data passes involved in training the portion of the machine learning model, a choice of model optimization algorithm, a number of neighbors in a k-nearest neighbor algorithm, a learning rate, and other hyperparameters. As discussed, training application 122 can apply the received information to a model training algorithm to train a portion of the machine learning model associated with the selected job.

In some embodiments, each outstanding job in job repository 150 may be associated with a minimum training data set size and a corresponding minimum performance level for client devices 120 that may participate in training a portion of the machine learning model associated with the outstanding job. Job registry service 142 may use the minimum training data set size and/or minimum performance level to filter the list of jobs returned to a client device 120 such that jobs having a minimum performance level exceeding the determined performance level of the client device 120 are excluded from the list of jobs made available to the client device 120 for participation. In some embodiments, where all available jobs are provided to training application 122 executing on client device 120, job registry service 142 can use performance information for the client device 120 to determine whether to allow client device 120 to become a participating client device 120 for training a machine learning model associated with a selected job or request the selection of a different job for the client device 120 to participate in processing.

Parameter service 144 generally maintains records of client devices 120 that are participating in training a machine learning model associated with a given job and the chunks of data assigned to each of the participating client devices 120 and aggregates results of training portions of the machine learning model received from the participating client devices 120 to generate the machine learning model associated with the given job. Parameter service 144 may maintain, for each active job being processed within a distributed computing system, an indication of the next chunk of data to be processed by a participating client device 120. The indication of the next chunk of data to be processed may be structured as a global cursor and may be updated as chunks of data are assigned to participating client devices 120.

When parameter service 144 receives a request from a client device 120 for information identifying a chunk of data to obtain from storage service 160 for a selected job, parameter service 144 generally identifies a chunk of data for the client device 120 to retrieve and transmits an indication of the chunk of data to the client device 120. In some embodiments, the indication of the chunk of data may include the global cursor, which may be an index of a specific segment in the training data set associated with the selected job (e.g., where training data set is divided a priori into a plurality of segments). In some embodiments, parameter service 144 may provide chunks of data sized based, at least in part, on the performance level information associated with the client device 120. The size of a chunk of data may be mapped, for example, to different ranges of performance levels determined for a client device 120. The indication of the chunk of data may include, for example, the global cursor (which, as discussed above, may indicate the first data element in the training data set and a number of records to retrieve from storage service 160. The number of records to retrieve from storage service 160 may be calculated by parameter service 160 based on a comparison of an expected amount of time to process a given number of records for a device with a baseline performance level and the performance level of client device 120 calculated from benchmarking components in training application 122, as discussed above.

In some embodiments, parameter service 144 may set a timeout period for a client device 120 indicating a latest time at which the client device 120 is expected to provide the results of training its assigned portion of the machine learning model using the identified chunk of data. If parameter service 144 receives a response from the client device 120 before the timeout period expires, parameter service 144 can determine that client device successfully trained its assigned portion of the machine learning model and may allow the client device 120 to request another set of training data to process (for either the same job or a different job). If, however, parameter service 144 does not receive a response from client device 120 before the timeout period expires, parameter service 144 can determine that client device 120 did not successfully complete processing of its assigned portion of the machine learning model. Parameter service 144 can reassign the chunk of data to another client device for processing. The client device selected by parameter service 144 may be selected such that the performance level of the selected client device exceeds the performance level of the client device 120 that failed to successfully train the assigned portion of the machine learning model. In some embodiments, where the chunk of data exceeds a minimum training data set size such that the chunk of data could be divided into multiple smaller chunks that meet or exceed the minimum training data set size, parameter service 144 can divide the chunk of data into these smaller chunks and assign each of the smaller chunks to a different client device 120. In some embodiments, the chunks of data associated with failed portions of the job may be re-queued for assignment at a later date and need not be re-assigned immediately after the timeout period expires.

In some embodiments, parameter service 144 can adjust the performance level of a client device 120 in response to a failure to receive a response from the client device 120 within the timeout period. By adjusting the performance level of the client device downwards to reflect degraded performance at client device 120, parameter service 144 can adjust the amount of data that may be assigned to the client device 120 for subsequent processing such that the client device 120 can continue to participate in training a machine learning model associated with a specific job. In some embodiments, if parameter service 144 adjusts the performance level of a client device 120 below a minimum performance level defined for a job, parameter service 144 can remove the client device 120 from the set of devices participating in training the machine learning model associated with the job. By removing the client device 120 from the set of devices participating in training the machine learning model associated with the job, parameter service 144 can prevent client device 120 from wasting computing resources on jobs that it is unlikely to complete successfully and allow client device 120 to participate in other jobs with lesser minimum performance levels.

Job repository 150 may be one or more databases used to store data identifying outstanding model training jobs that client devices 120 can participate in. As discussed, each entry in job repository 150 may identify a type of machine learning model to be trained, the data set associated with the machine learning model, hyperparameters to be used in configuring an algorithm for training a machine learning model, and other information that defines the job. Storage service 160 may include one or more databases used to store training data sets associated with each of the model training jobs. In some embodiments, storage service 160 may further include user authentication and security components that may be used to control access to training data sets, as discussed above.

In some embodiments, model training manager 140 and storage service 160 may include multiple systems distributed geographically. Model training manager 140 may maintain information about the network locations and/or geographic locations of each of the client devices 120 participating in training a machine learning model and each of the data repositories associated with storage service 160 to assign chunks of data based on the proximity of a client device 120 to the model training manager 140 and data repository of storage service 160. In some embodiments, storage service 160 may periodically shuffle the data in a training data set associated with a particular job across the plurality of geographically distributed repositories so that each of the client devices 120 may train a portion of the machine learning model using diverse sets of data chunks, resulting in a more accurately trained model.

While peer registry service 130, model training manager 140, job repository 150, and storage service 160 are illustrated as separate components in FIG. 1, it should be recognized that peer registry service 130, model training manager 140, job repository 150, and storage service 160, and components thereof, may be implemented on any number of computing systems, either as one or more standalone systems or in a distributed environment.

Figure 2:
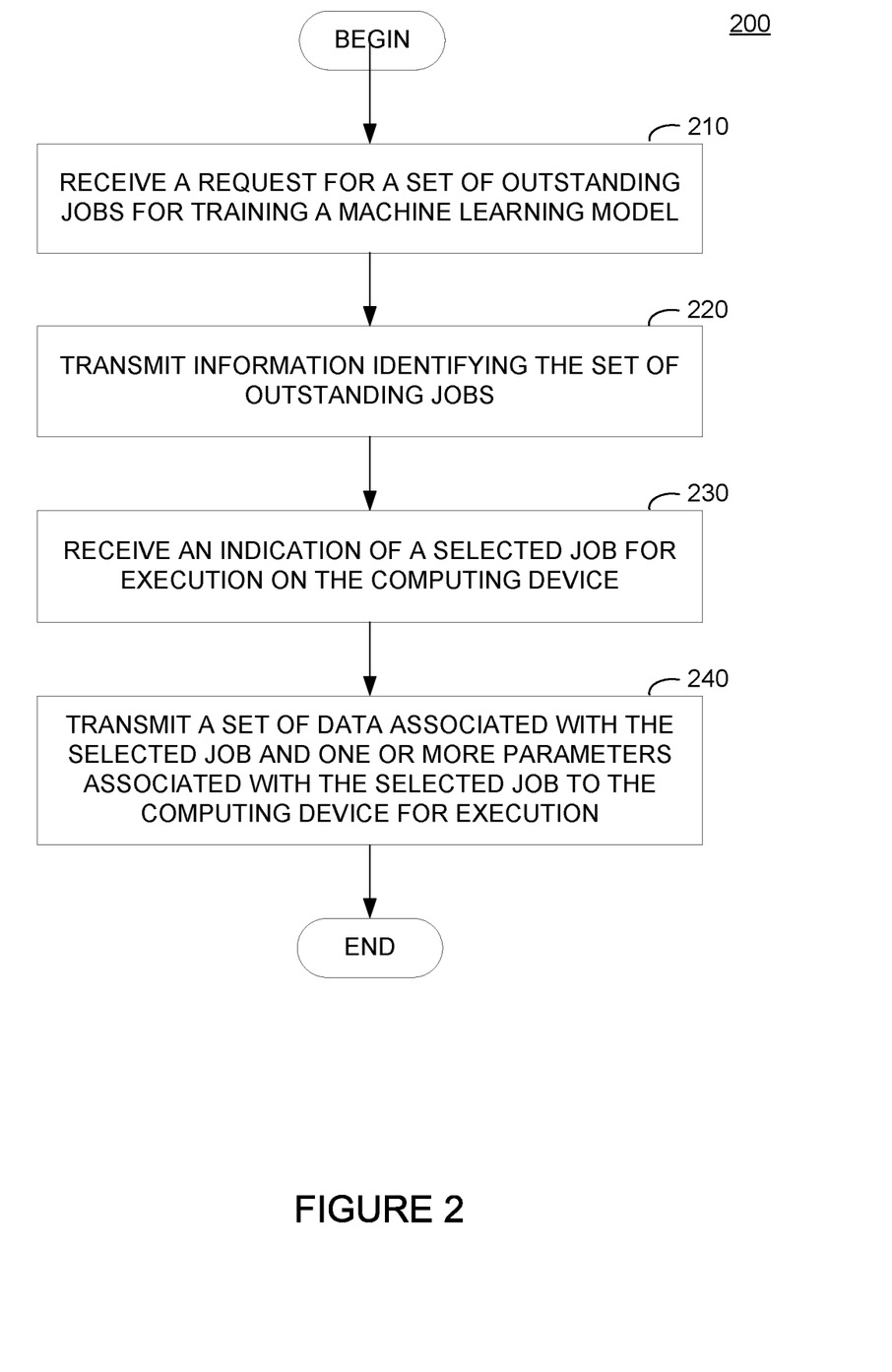
FIG. 2 illustrates example operations for distributing a portion of a machine learning model training job to a computing device in a distributed computing architecture for training a machine learning model, according to one embodiment.

FIG. 2 illustrates example operations 200 that may be performed by a system to distribute a portion of a machine learning model training job to a computing device in a distributed computing environment, according to one embodiment. Operations 200 may be performed, for example, by model training manager 140 illustrated in FIG. 1.

As illustrated, operations 200 begin at block 210, where a system receives, from a training application or library executing on a client device, a request for a set of outstanding jobs for training a machine learning model. In some embodiments, the request for the set of outstanding jobs may include, for example, information identifying a client device from which the request was received, performance level information associated with the client device, user credentials, and other information that the system can use to identify jobs that the client device may participate in processing. In response to receiving the request, the system can search a job repository for information about outstanding model training jobs that a client device can participate in processing. Generally, the outstanding model training jobs may include model training jobs having status information indicating that the job is in progress, not started, or re-queued for processing. In some embodiments, the system can retrieve information for all of the outstanding model training jobs in job repository 150. In some embodiments, where the client device provides information that can limit the jobs retrieved from job repository 150 to those that are relevant to the requesting client device or the user of the requesting client device, the system can use the provided information to remove jobs from the set of outstanding jobs that the user cannot participate in. These jobs may include, for example, jobs with a minimum performance level above the performance level of the client device, jobs for which user credentials would not allow the user of the requesting client device to access training data, jobs restricted to networks that the client device is not a member of, and the like.

At block 220, the system transmits information identifying the set of outstanding jobs to a requesting client device. The information identifying the set of outstanding jobs may include unique identifiers for each of the set of outstanding jobs that a receiving client device can use to indicate, to the system, that the client device would like to participate in processing a specific outstanding job.

At block 230, the system receives an indication of a selected job for execution on the computing device. At block 240, the system transmits a set of data associated with the selected job and one or more parameters associated with the selected job to the computing device for execution. As discussed, the set of data associated with the selected job may be a chunk of a training data set associated with the selected job. The chunk of the training data set may be selected based on a global cursor maintaining a record of the data in the training data set that has previously been dispatched for processing by one or more client devices in a distributed computing system. The chunk of training data may have a fixed size, determined a priori by the system, or may have a variable size determined based on a performance level associated with a baseline chunk size and the performance level of the requesting client device. The parameters associated with the selected job may include, for example, model hyperparameters used in training the portion of the machine learning model based on the chunk of data, timeout period information, and the like.

Figure 3:
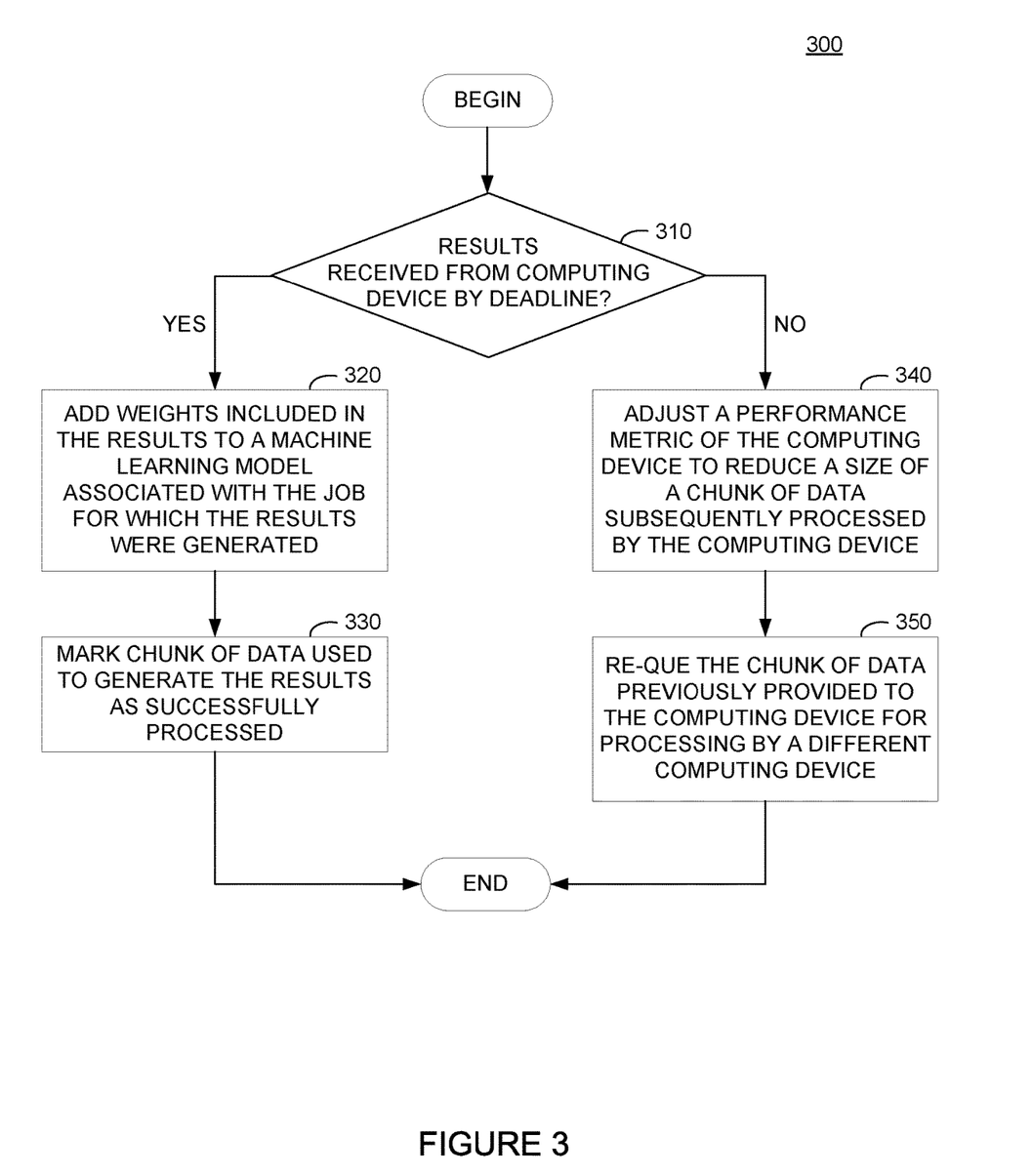
FIG. 3 illustrates example operations for processing results of a model training process received from a computing device in a distributed computing architecture for training a machine learning model, according to one embodiment.

FIG. 3 illustrates example operations 300 that may be performed by a system for processing the expected results of a model training process generated by a computing device in a distributed computing environment, according to an embodiment. Operations 300 may be performed, for example, by model training manager 140 illustrated in FIG. 1.

As illustrated, operations 300 begin at block 310, where the system determines whether results were received from a computing device by a completion deadline set for the computing device to train a portion of a machine learning model using a chunk of data. In some embodiments, the system can determine whether the results were received by the completion deadline based on a receipt timestamp at the system such that a consistent timing source is used to determine whether the results were received by the completion deadline and avoid erroneous determinations that may be caused by clock skew between a clock maintained at the system and a clock maintained at a client device.

If, at block 310, the system determines that the results were received by the completion deadline, operations 300 proceed to block 320, where the system adds weights included in the results to a machine learning model associated with the job for which the results were generated. At block 330, the system marks the chunk of data used to generate the results as successfully processed. Subsequently, the system may allow the client device to request another chunk of data to train a portion of a machine learning model associated with the same job or a different job in job repository 150. In some embodiments, the system may dispatch the chunk of data to another client device as backup or to cross-check the results generated by a first client device.

If at block 310, the system determines that the results were not received by the completion deadline, operations 300 proceed to block 340, where the system adjusts a performance metric of the computing device. As discussed, the adjustment of the performance metric of the computing device may be used to reduce the size of a chunk of data subsequently processed by the computing device. In some embodiments, the system can use a delta between the deadline and a time at which the results are received from the computing device in order to adjust the performance metric of the computing device. Generally, adjustments to the performance metric of the computing device may reflect that the computing device was unable to process a particular size of a chunk of data within a specified time, and adjustments may be made to the amount of data assigned to the computing device in the future to comply with the expected deadlines for training a portion of a machine learning model.

At block 350, the system re-queues the chunk of data previously provided to the computing device for reassignment and processing by a different computing device in the distributed system. In some embodiments, re-queuing the chunk of data may entail assigning the chunk of data to the next available computing device that is participating in processing the job associated with the machine learning model. In some embodiments, re-queueing the chunk of data may entail marking the chunk of data for further processing after the system has initially assigned the entirety of the training data set to the plurality of computing devices.

Figure 4:
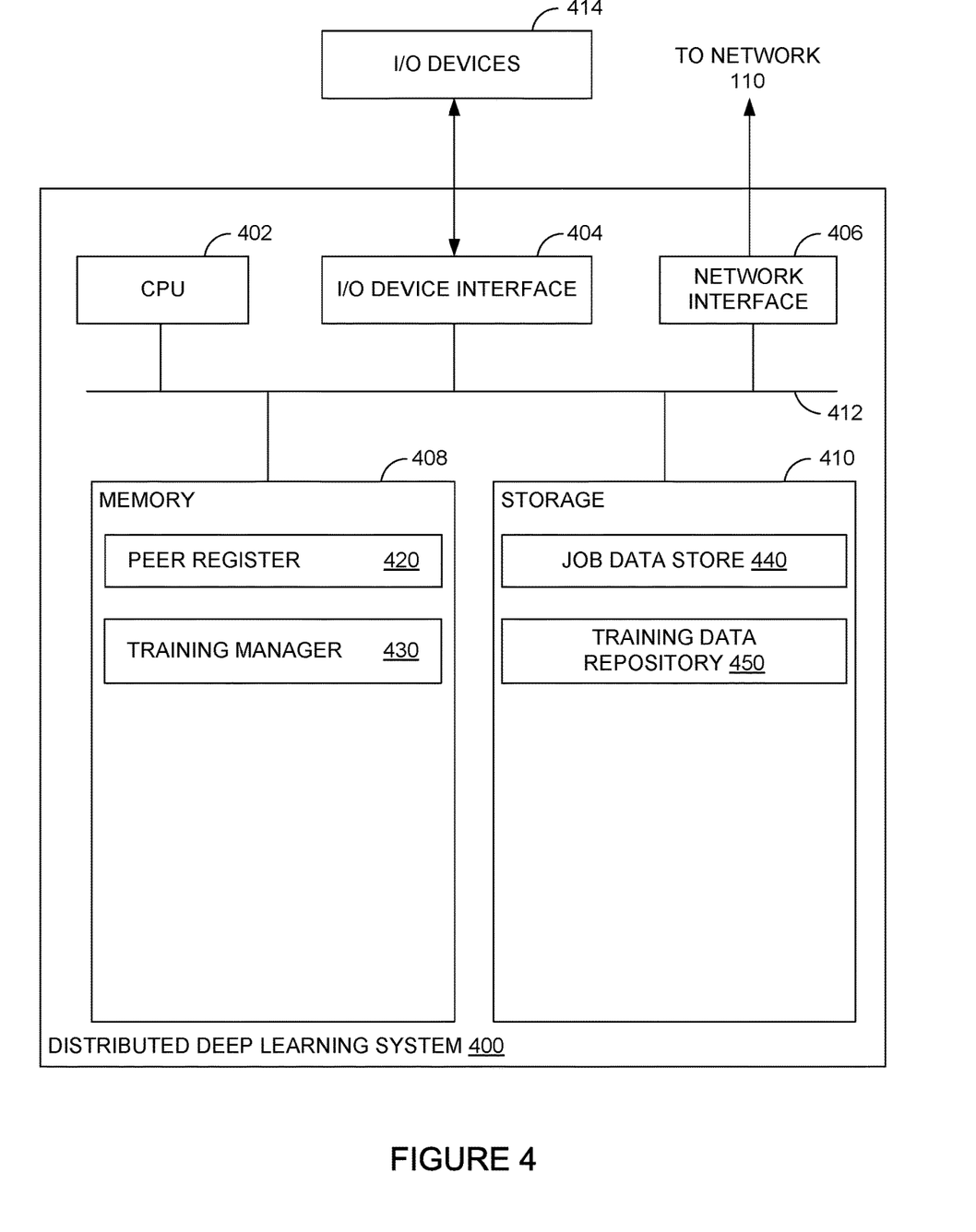
FIG. 4 illustrates an example system in which aspects of the present disclosure may be performed.

FIG. 4 illustrates an example distributed deep learning system 400 that distributes machine learning model training tasks across a plurality of computing systems in a distributed system, according to an embodiment. As shown, distributed deep learning system 400 includes, without limitation, a central processing unit 402, one or more I/O device interfaces 404, which may allow for the connection of various I/O devices 414 (e.g., keyboards, displays, mouse devices, pen input, etc.) to the entity analytics system 400, network interface 406, a memory 408, storage 410, and an interconnect 412.

CPU 402 may retrieve and execute programming instructions stored in the memory 408. Similarly, the CPU 402 may retrieve and store application residing in the memory 408. The interconnect 412 transmits programming instructions and application data among the CPU 402, I/O device interface 404, network interface 406, memory 408, and storage 410. CPU 402 is included to be representative of a single CPU, multiple CPUs, a single CPU having multiple processing cores, and the like. Additionally, the memory 408 is included to be representative of a random access memory. Furthermore, storage 410 may be a disk drive. Although shown as a single unit, the storage 410 may be a combination of fixed and/or removable storage devices, such as fixed disc drives, solid state drives, removable memory cards or optical storage, network attached storage (NAS), or a storage area network (SAN).

As illustrated, memory 408 includes a peer register 420 and a training manager 430. Peer register 420 generally maintains a list of computing devices that have downloaded a training application or application including a training library usable in conjunction with the distributed deep learning system 400. The list of computing devices may include information identifying computing systems that have registered to participate in distributed model training tasks. In some embodiments, the list of computing devices may further include performance metrics or performance level information determined for each of the computing devices, network domain information, user authentication information, and other information that can be used to identify jobs that a computing device can participate in processing.

Training manager 430 generally processes requests for outstanding jobs and requests for chunks of data to use in performing a training process associated with an outstanding job received from a computing device (e.g., a client device 120 illustrated in FIG. 1). Generally, as discussed above, a computing device can request a list of outstanding jobs that the computing device can participate in processing, specify a specific job to participate in processing, and request a chunk of data from a training data set associated with the specified job. When a computing device is assigned to train a portion of a machine learning model based on a specified chunk of data, training manager 430 may set a deadline for receiving the results of the training from the computing device. If training manager 430 receives the results of the training by the deadline, training manager 430 can add the results to the machine learning model associated with the specified job and dispatch another chunk of data to the computing device for processing. If, however, training manager 430 does not receive the results of the training by the deadline, training manager 430 can re-queue the chunk of data for processing by a different computing device in a distributed computing system.

Storage 410, as illustrated, includes a job data store 440 and a training data repository 450. Job data store 440 generally represents a data repository in which details of jobs that are available for processing by computing devices in a distributed computing system are stored. Each job includes a unique identifier, a status, and, in some embodiments, other information that may be used to determine whether a computing device can participate in processing a job. Training data repository 450 is generally representative of a repository in which training data sets associated with a job are stored. Training data repository 450 may include a plurality of discrete repositories in which training data sets may be distributed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specifically described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer-readable storage medium (or media) having computer readable program instructions thereon for causing a processor to carry out aspects of the present invention.

The computer-readable storage medium can be a physical device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for distributing training of a machine learning model across a plurality of computing devices, comprising:
    receiving, from a computing device of the plurality of computing devices, a request for a set of outstanding jobs for training part of a machine learning model;
    transmitting, to the computing device, information identifying the set of outstanding jobs;
    receiving, from the computing device, a selected job for execution on the computing device from the set of outstanding jobs, the selected job being associated with a machine learning model to be trained;
    transmitting, to the computing device, a chunk of training data associated with the selected job and one or more parameters associated with the selected job; and
    taking one or more actions with respect to the chunk of data associated with the selected job based on a response from the computing device.

2. The method of claim 1, wherein the taking one or more actions comprises:
    receiving, from the computing device, a set of weights calculated from the chunk of training data associated with the selected job; and
    adding the received set of weights to the machine learning model associated with the selected job.

3. The method of claim 1, wherein the one or more parameters include a deadline for reporting a result of processing the chunk of data associated with the selected job, and the taking one or more actions comprises:
    determining, that the computing device did not generate a valid response before the deadline; and
    resetting a status for the chunk of data associated with the selected job such that the chunk of data associated with the selected job can be assigned to another computing device in the plurality of computing devices.

4. The method of claim 3, further comprising:
    adjusting a performance metric associated with the computing device.

5. The method of claim 4, further comprising:
    receiving, from the computing device, a subsequent request for a set of outstanding jobs to execute on the computing device;
    selecting, from the outstanding jobs, a group of outstanding jobs having performance metrics less than or equal to the adjusted performance metric associated with the computing device; and
    transmitting, to the computing device, the selected group of outstanding jobs for selection.

6. The method of claim 1, further comprising:
    periodically moving chunks of training data including the chunk of training data across a plurality of training data repositories.

7. The method of claim 6, wherein the chunk of training data is selected based on a geographic proximity of a data repository storing the chunk of training data to the computing device.

8. The method of claim 1, wherein the chunk of training data is selected based on information identifying a position within a set of training data for the selected job corresponding to chunks of training data that have been previously dispatched for processing by the plurality of computing devices.

9. The method of claim 1, wherein a size of the chunk of training data is selected based on one or more performance characteristics of the computing device.

10. The method of claim 9, further comprising:
    determining the performance characteristics of the computing device are determined by:
        transmitting, for execution on the computing device, a benchmarking suite, and
        receiving a score from the benchmarking suite indicative of a level of performance of the computing device;
    wherein ranges of scores are mapped to different sizes of chunks of training data.

11. The method of claim 1, further comprising:
    transmitting, to the computing device, a training algorithm to be used by the computing device in performing the selected job using the chunk of data and the one or more parameters.

12. A system, comprising:
    a processor; and
    a memory having instructions stored thereon which, when executed by the processor, performs an operation for distributing training of a machine learning model across a plurality of computing devices, the operation comprising:

receiving, from a computing device of the plurality of computing devices, a request for a set of outstanding jobs for training part of a machine learning model;

transmitting, to the computing device, information identifying the set of outstanding jobs;

receiving, from the computing device, a selected job for execution on the computing device from the set of outstanding jobs, the selected job being associated with a machine learning model to be trained;

transmitting, to the computing device, a chunk of training data associated with the selected job and one or more parameters associated with the selected job; and taking one or more actions with respect to the chunk of data associated with the selected job based on a response from the computing device.

13. The system of claim 12, wherein the taking one or more actions comprises:

receiving, from the computing device, a set of weights calculated from the chunk of training data associated with the selected job; and adding the received set of weights to the machine learning model associated with the selected job.

14. The system of claim 12, wherein the one or more parameters include a deadline for reporting a result of processing the chunk of data associated with the selected job, and the taking one or more actions comprises:

determining, that the computing device did not generate a valid response before the deadline; and resetting a status for the chunk of data associated with the selected job such that the chunk of data associated with the selected job can be assigned to another computing device in the plurality of computing devices.

15. The system of claim 14, further comprising:

adjusting a performance metric associated with the computing device.

16. The system of claim 15, further comprising:

receiving, from the computing device, a subsequent request for a set of outstanding jobs to execute on the computing device;

selecting, from the outstanding jobs, a group of outstanding jobs having performance metrics less than or equal to the adjusted performance metric associated with the computing device; and transmitting, to the computing device, the selected group of outstanding jobs for selection.

17. The system of claim 11, further comprising:

periodically moving chunks of training data including the chunk of training data across a plurality of training data repositories, wherein the chunk of training data is selected based on a geographic proximity of a data repository storing the chunk of training data to the computing device.

18. The system of claim 11, wherein the chunk of training data is selected based on information identifying a position within a set of training data for the selected job corresponding to chunks of training data that have been previously dispatched for processing by the plurality of computing devices.

19. The system of claim 11, wherein a size of the chunk of training data is selected based on one or more performance characteristics of the computing device.

20. A computer-readable medium having instructions stored thereon which, when executed by a processor, performs an operation for distributing training of a machine learning model across a plurality of computing devices, the operation comprising:

receiving, from a computing device of the plurality of computing devices, a request for a set of outstanding jobs for training part of a machine learning model;

transmitting, to the computing device, information identifying the set of outstanding jobs;

receiving, from the computing device, a selected job for execution on the computing device from the set of outstanding jobs, the selected job being associated with a machine learning model to be trained;

transmitting, to the computing device, a chunk of training data associated with the selected job and one or more parameters associated with the selected job; and taking one or more actions with respect to the chunk of data associated with the selected job based on a response from the computing device.

* * * * *